G. H. COLE.
CONSTANT CURRENT REGULATOR.
APPLICATION FILED DEC. 4, 1915.
1,306,525.
Patented June 10, 1919.
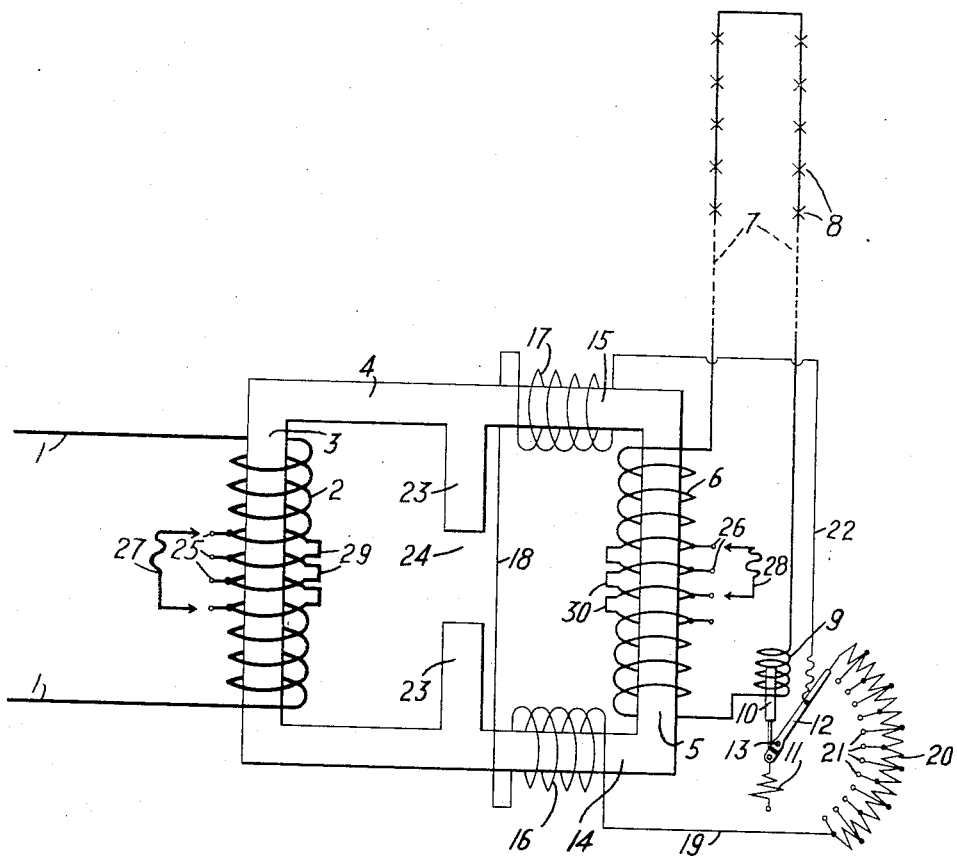
WITNESSES:
Fred A. Lind.
Geo. W. Hansen.
INVENTOR
Guerney H. Cole
BY
Wesley G. Carr
ATTORNEY

UNITED STATES PATENT OFFICE.

GUERNEY H. COLE, OF MOUNT OLIVER, PENNSYLVANIA, ASSIGNOR TO WESTINGHOUSE ELECTRIC AND MANUFACTURING COMPANY, A CORPORATION OF PENNSYLVANIA.

CONSTANT-CURRENT REGULATOR.

1,306,525.     Specification of Letters Patent.    Patented June 10, 1919.

Application filed December 4, 1915. Serial No. 65,018.

*To all whom it may concern:*

Be it known that I, GUERNEY H. COLE, a citizen of the United States, and a resident of Mount Oliver, in the county of Allegheny and State of Pennsylvania, have invented a new and useful Improvement in Constant-Current Regulators, of which the following is a specification.

My invention relates to alternating-current transforming devices and especially to transformers that are adapted to furnish power to constant-current load devices.

More particularly, my invention relates to constant-current transformers or regulators in which moving coils are absent and which may be employed to interconnect constant-voltage supply circuits with constant-current load circuits.

At present, constant-current transformers or regulators adapted to convert constant-voltage energy into constant-current energy comprise magnetizable core members, each being embraced by two superposed coils which act inductively upon each other. The essential feature of a regulator of this character is that its secondary coil is movable and is connected to the constant-current load devices, while the primary or stationary coil is connected to the constant-potential circuit. When the secondary load is disconnected from the secondary coil, the latter rests on the primary coil since a part only of its weight is balanced through a counterweight mechanism. On connecting the constant-current load devices to the secondary or movable coil, the latter is repelled upwardly by reason of the magnetic repulsion between the primary and secondary coils. The adjustment between the relative positions of the primary and secondary coils affects the electromotive forces induced in the latter, this resulting from the magnetic leakage between the two coils which increases as the distance between the coils increases. The aforementioned counterweight mechanism is so adjusted that, with any position of the movable coil, the secondary current induced in it remains at a practically constant value. When the load on the secondary coil decreases, the current momentarily tends to increase, and this, consequently, increases the repelling action between the coils with the result that the electromotive force induced in the secondary coil is decreased and, consequently, the current induced therein remains at a practically constant value. Since regulators of the above-mentioned character are in common use, further explanation thereof is not deemed necessary.

In the regulator of the present invention, however, I have dispensed with movable coils and the expensive counterweight mechanism associated therewith. Moreover, my present regulator is stable, as regards its electrical characteristics, and is not influenced in its operation by fluctuations or current surges in the constant-current circuit. Since the coils embodied in my regulator are stationary, convenient taps may be provided which permit of adapting the regulator to a wide range of voltages and currents. Again, the regulator is simple and economical to construct, and reliable in operation, requiring only a small amount of attention by the operator.

For a better understanding of the nature and scope of my invention, reference may be had to the following description and the accompanying drawing, the single figure of which is a diagrammatic representation of a constant-current transformer or regulator embodying a form of my invention.

Referring to the drawing, constant-potential mains 1 are connected to the terminals of a primary coil 2 which embraces a core leg 3 of a magnetizable core member 4. A second core leg 5, which corresponds to the core leg 3, is surrounded by a secondary coil 6, the latter being permanently disposed thereupon, as shown. A constant-current circuit 7, represented as supplying constant current to a plurality of series arc lamps 8, is connected to the secondary coil 6 and is thereby furnished with constant-current energy from the constant-potential mains 1. A solenoid 9, which is shown for convenience as being connected in series circuit with the arc lamps 8, influences, through its magnetic induction, a magnetizable core member 10 that is adapted to move upwardly or downwardly in accordance with the degree of magnetic attraction arising from the solenoid 9. The core member 10 is restrained in its movements by a resilient member or spring 11 that is attached to its lower end. The plunger 10 is also pivotally connected to a lever arm 12 which is adapted to rotate about an axis 13.

Cross arms 14 and 15 of the core member 4, which extend between the core legs 3 and 5, are severally provided with auxiliary coils 16 and 17, that are connected in series relationship, as shown, through a connector 18. One of the terminals of the coils 16 is connected through a conductor 19 to an adjustable resistance element 20 which is provided with a plurality of taps 21 arranged in dial-formation so as to be conveniently engaged by the aforementioned rotatable arm 12. The arm 12 is also connected, through a conductor 22, to the free terminal of the coil 17. It will be apparent, therefore, that the resistance element 20, or portions thereof, may be connected in a local circuit with the auxiliary coils 16 and 17. Under certain load conditions, however, it may be desirable to substitute, for the resistance element 20, a reactance element, the advantages of which, when employed, are apparent to those skilled in the art.

Referring to the core member 4, it will be noted that inwardly projecting portions 23 extend between the core legs 3 and 5 and are separated from each other by an air gap 24 the length of which is dependent upon the design of the constant-current regulator and the service to which it is to be subjected. The projecting portions 23 are interposed between the auxiliary coils 15 and 16 and the primary coil 2, since they provide a leakage path of comparatively high reluctance for the magnetic leakage flux existing between the primary and secondary coils.

Under normal load conditions in the constant-current circuit 7, a certain leakage flux generated by the primary coil 2 will be forced to flow through the projecting members 23 by reason of the opposing or choking action resulting from the induced current flow in the coils 16 and 17. This may be explained as follows: The current traversing the constant-current circuit 7 influences the magnetizable plunger 10 of the solenoid 9, thereby effecting the introduction of a certain quantity of resistance in the local circuit comprising the auxiliary coils 16 and 17. The coils 16 and 17 are so wound and arranged on the core member 4 that they instantly oppose any change in the current flowing in the circuit 7. Since movement of the conducting arm 12 is proportional to the current flow through the solenoid 9, the amount of resistance inserted in the aforesaid circuit by reason of the resistance element 20 is inversely proportional to the current flowing in the load circuit 7. The bucking or choking action of the coils 16 and 17 is, consequently, controlled by the amount of current flowing in the constant-current circuit 7 and, therefore, the leakage flux traversing the leakage path comprising the projections 23 is likewise controlled by the current flowing in the constant-current circuit 7. The adjustments effected are such that the varying leakage flux between the primary coil 2 and the secondary coil 6 will maintain the current flowing in the load circuit 7 at a constant value.

Since the coils 2 and 6 are stationary coils, it will be noted that no regulating or counterweight mechanism is necessary for moving the coils relatively to each other to vary the induction between the primary and secondary windings in my constant-current transformer. For wide variations in the electrical conditions, taps 25 and 26 are provided on the central portions of the coils 2 and 6, respectively, and connectors 27 and 28 are furnished, therefore, for varying the active turns comprising the primary and secondary windings. In this manner, the end turns of each of the coils 2 and 6 may be employed to protect the transformer windings, since the end turns are usually provided with excess insulation to withstand excessive strains that may be imposed thereupon by reason of surges or disturbances occurring in the supply or load circuits. Adjustable connectors 29 and 30 are provided in order that the coils 2 and 6 may be protected from short circuit currents when the taps 25 and 26 are connected to the connectors 27 and 28, respectively.

While I have described, in detail, a constant-current regulator embodying a particular form of magnetizable core member 4, it will be apparent to those skilled in the art that many other provisions may be made to regulate the leakage flux between the primary and secondary windings, and also that other modifications may be made without departing from the spirit and scope of the appended claims.

I claim as my invention:

1. A constant-current regulator comprising a magnetizable core member, a stationary primary coil mounted on the core member and adapted for connection to a constant-potential circuit, a stationary secondary coil mounted on the core member and adapted to furnish energy to constant-current load devices, a regulating coil embracing the core member, and means influenced by the change in the secondary current to so vary the current traversing the regulating coil that the current flowing through said secondary coil is maintained substantially constant.

2. A constant-current regulator comprising a magnetizable core member having a stationary primary coil, a stationary secondary coil, and a stationary regulating coil mounted thereon, and means influenced by the secondary current for so varying the current traversing the regulating coil that the magnetic leakage flux between the primary and secondary coils is adjusted.

3. A constant-current regulator comprising a magnetizable core member, a stationary primary winding embracing one leg thereof, a stationary secondary winding embracing another leg, a magnetic shunt of high reluctance disposed between said windings, a regulating winding embracing the core member intermediate said secondary winding and the magnetic shunt, an adjustable current-limiting device connected in circuit therewith, and an electromagnet controlled by the secondary current flow for adjusting the current-limiting device whereby the choking action of the regulating winding may be varied to maintain the current traversing the secondary winding substantially constant.

4. A constant-current regulator comprising a magnetizable core member having a stationary primary coil, a stationary secondary coil and a third stationary coil mounted thereon, and an electromagnet connected in series with the secondary coil for so controlling the current through the said third coil that substantially constant current traverses the secondary coil.

5. A constant-current regulator comprising a magnetizable core member, a stationary primary winding embracing one leg thereof, and a stationary secondary winding embracing another leg, a magnetic shunt of high reluctance disposed between said primary and secondary windings, a coil embracing a leg of the core member between the shunt and the secondary winding, and means controlled by the change in the secondary current for so varying the current that traverses the said coil that the current flowing through said secondary winding is maintained at a substantially constant value.

6. A constant-current regulator comprising a magnetizable core member, a stationary primary winding embracing one leg thereof, a stationary secondary winding embracing another leg, a magnetic shunt of high reluctance disposed between said primary and secondary windings, a regulating winding embracing one leg of the core member, and means controlled by the change in the secondary current for so adjusting the current traversing the regulating winding that the flow of magnetic leakage flux across said magnetic shunt may be varied.

7. A constant-current regulator comprising a magnetizable core member, a stationary primary coil embracing one leg thereof, a stationary secondary coil embracing another leg, a magnetic shunt of high reluctance disposed between said primary and secondary coils, a regulating coil embracing the core member intermediate said secondary coil and said magnetic shunt, an adjustable current-limiting device connected in circuit therewith, and means, controlled by the secondary current flow, for adjusting said current-limiting device, whereby choking action of said regulating coil may be varied to maintain the current flow through said secondary coil substantially constant.

8. A constant-current regulator comprising a magnetizable core member, a stationary primary coil embracing one leg thereof, a stationary secondary coil embracing another leg, a magnetic shunt of high reluctance disposed between said primary and secondary windings, a regulating coil subject to the influence of the flux threading through said secondary coil, an adjustable current-limiting device connected in circuit therewith, and means controlled by the secondary current flow for adjusting the said current-limiting device, whereby the regulating coil may control the quantity of the magnetic flux threading through the secondary winding.

In testimony whereof, I have hereunto subscribed my name this 30th day of Nov. 1915.

GUERNEY H. COLE.